United States Patent [19]

Kato

[11] Patent Number: 4,941,103
[45] Date of Patent: Jul. 10, 1990

[54] RUNNING TYPE ROBOT CONTROL SYSTEM

[75] Inventor: Hisao Kato, Aichi, Japan

[73] Assignee: Mitsubishi Denki Kabushiki Kaisha, Tokyo, Japan

[21] Appl. No.: 242,577

[22] Filed: Sep. 12, 1988

[30] Foreign Application Priority Data

Sep. 11, 1987 [JP] Japan .................................. 62-226571
Sep. 30, 1987 [JP] Japan .................................. 62-247214

[51] Int. Cl.⁵ .............................................. B62D 1/24
[52] U.S. Cl. ..................................... 364/513; 364/461; 318/587; 901/49
[58] Field of Search ................... 364/513, 461, 424.02; 901/49, 50; 180/167, 168; 318/587

[56] References Cited

U.S. PATENT DOCUMENTS

| | | | |
|---|---|---|---|
| 3,669,206 | 6/1972 | Tax et al. ............................. | 318/587 |
| 4,284,160 | 8/1981 | DeLiban et al. ..................... | 318/587 |
| 4,379,497 | 4/1983 | Hainsworth et al. ................ | 318/587 |
| 4,656,406 | 4/1987 | Houskamp ............................ | 318/587 |
| 4,780,817 | 10/1988 | Lofgren ................................ | 318/587 |
| 4,817,750 | 4/1989 | Ishida et al. ......................... | 318/587 |

Primary Examiner—Allen MacDonald
Attorney, Agent, or Firm—Sughrue, Mion, Zinn, Macpeak & Seas

[57] ABSTRACT

A running type robot control system in which a plurality of running type robots run along a common running path to actuate machines arranged at both sides of the running path cooperatively. With such a running type robot control system, while in service, the running type robots are controlled so that no interference occurs in service areas of the robots. Further, the running path is provided with turnouts at both ends thereof. When one of the robots is inoperative, the damaged robot is controlled to be directed to the turnout, and the remaining robot is controlled to cover all of the machines. Consequently, productivity or workability is improved remarkably.

8 Claims, 5 Drawing Sheets

RUNNING TYPE ROBOT CONTROL SYSTEM

BACKGROUND OF THE INVENTION

The present invention relates to a running type robot control system in which a plurality of running type robots run along a common running path. More particularly, the invention relates to an improvement in a control system capable of preventing one of the running type robots from interfering with a service areas of at least one ether adjacent running type robot.

Recently, a running type robot control system has been proposed, in which a robot runs along a guide rail of a running path so as to actuate a plurality of machines. Examples of such a running type robot control system are disclosed in Published Unexamined Japanese Patent Application Nos. 28494/1983 and 37732/1983.

FIG. 1 is a plan view of an example of the running type robot control system. In FIG. 1, reference numeral 1 designates a running type robot; 2, a pair of guide rails provided on a running stand; 3, a service area of the robots 1, and 4, machines to be actuated by the robot 1. The machines 4 are numbered as No. 1 to No. 8, for instance.

As shown in FIG. 1, the plural machines No. 1 to No. 8 are arranged on both sides of the guide rails 2, and the robot 1 runs along the guide rails 2 so as to actuate the machines No. 1 to No. 8. A dot-dash line 3 indicates the service area of the robot.

Such a conventional system in which a single robot 1 runs along the paired guide rails 2 is disadvantageous in that a long period of time is required to actuate all of the machines arranged along a relatively long running path, or to cause the robot to return to an initial position after working, resulting in degrading workability or productivity. Further, it is also disadvantageous in that assuming that the robot may become unservicable, an entire production line may be put in an inactive state resulting in the stopping of production.

The other system has been proposed in order to improve the workability or productivity, in which a plurality of running type robots run along the common running path cooperatively. In this case, however, it is also disadvantageous in that there is a possibility that, depending on the arrangement of the robots, one robot may interfere with the service area of the other robot.

SUMMARY OF THE INVENTION

In view of the above, a primary object of the present invention is to eliminate difficulties accompanying the conventional running type robot control systems.

Another object of the invention is to provide a running type robot control system having a plurality of running type robots, which is capable of controlling the robots in cooperation with each other so that no interference between the robots adjacent to each other in their service areas may occur even if the running areas of the robots are overlapped.

A further object of the invention is to provide a running type robot control system in which two running type robots are employed in order to increase the workability or productivity of the system, and the robots are controlled so as to maintain desired workability or productivity even if one of the robots might be inoperative.

The above, and other objects of the present invention are accomplished by the provision of a running type robot control system which comprises means for detecting the respective present positions of running type robots running along a common running path; means for arithmetically obtaining a relative distance between two of the robots adjacent to each other based on an output of the present position detecting means; and means for controlling at least one of the two robots so as to maintain the relative distance to be not smaller than a predetermined distance. Due to the provision of such a running type robot control system, it is possible to prevent the service areas of the robot adjacent to each other from being interfered with by the other.

Further, according to the present invention, turnouts are respectively provided at both ends of the common running path, on the both sides of which a plurality of machines are arranged to be actuated by two running type robots, and each of the robots has a service area covering all of the machines. With such a system, when one of the robots is inoperative, the robot which is inoperative is led to its turnout, and the remaining robot is controlled so as to handle all of the machines. Accordingly, it is possible for two robots to cooperate under a normal operating condition thereby to make the operation periods of time of the robots shorter than that required for the system having a single running type robot. Consequently, the workability or productivity is improved remarkably. Further, even if one of the robots is out of order, it is possible to continue the operation of the remaining robot. Thus, the productivity may be reduced to half and complete interruption of operation of the system can be prevented.

BRIEF DESCRIPTION OF THE DRAWINGS

In the accompanying drawings.

DESCRIPTION OF THE PREFERRED EMBODIMENTS

Figure 1:
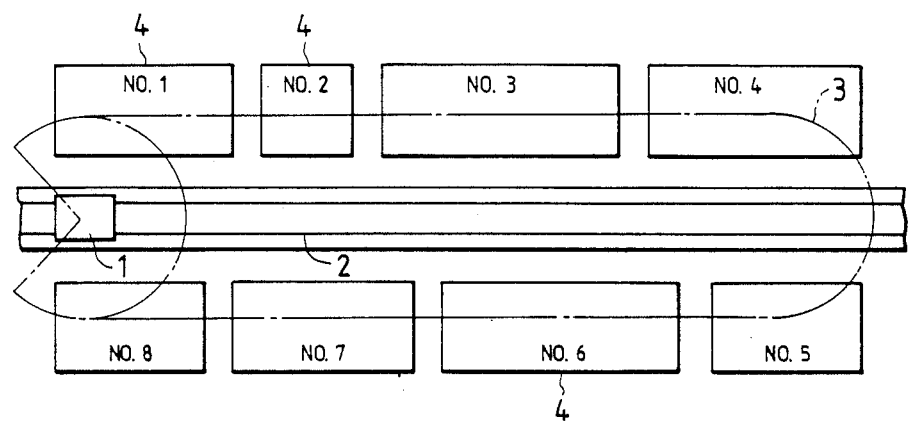
FIG. 1 is a schematic diagram showing a plan view of a conventional running type robot control system.
Figure 2:
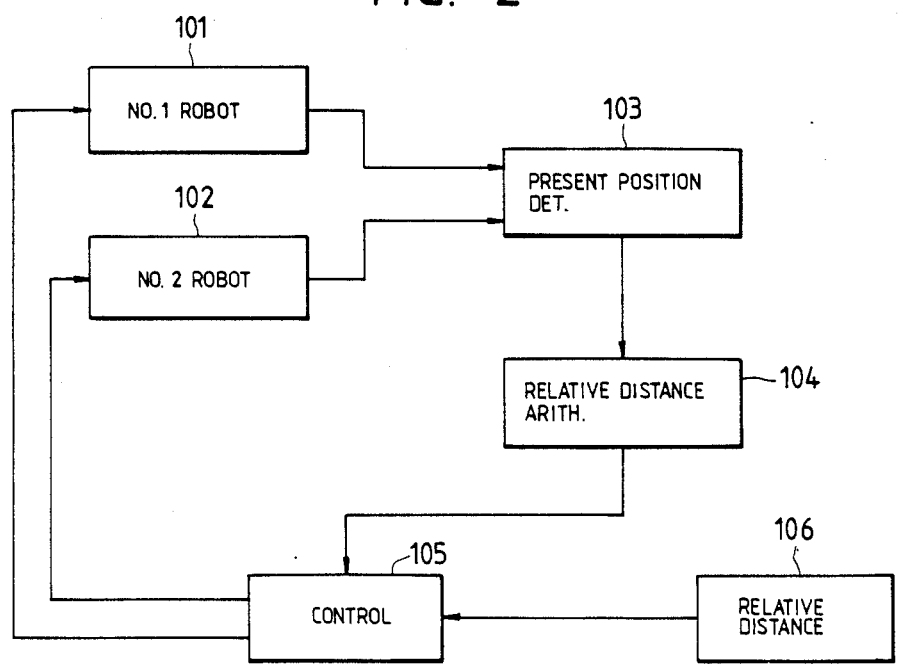
FIG. 2 is a block diagram showing an arrangement of a running type robot control system according to the present invention.

FIG. 2 is a block diagram briefly showing an embodiment of a running type robot control system according to the present invention, in which two running type robots run along a common running path. In this embodiment, as is clear from FIG. 2, the present positions of a No. 1 robot 101 and a No. 2 robot 102 which run along the common running path are detected by a present position detecting unit 103, respectively. Based on data representing the thus detected present positions of the robots 101 and 102, a relative distance between the two robots 101 and 102 is obtained arithmetically by a relative distance arithmetic unit 104. A control unit 105 operates to control at least one of the two robots 101 and 102 so that the relative distance therebetween always is maintained not lower than a predetermined standard distance 106.

Figure 3:
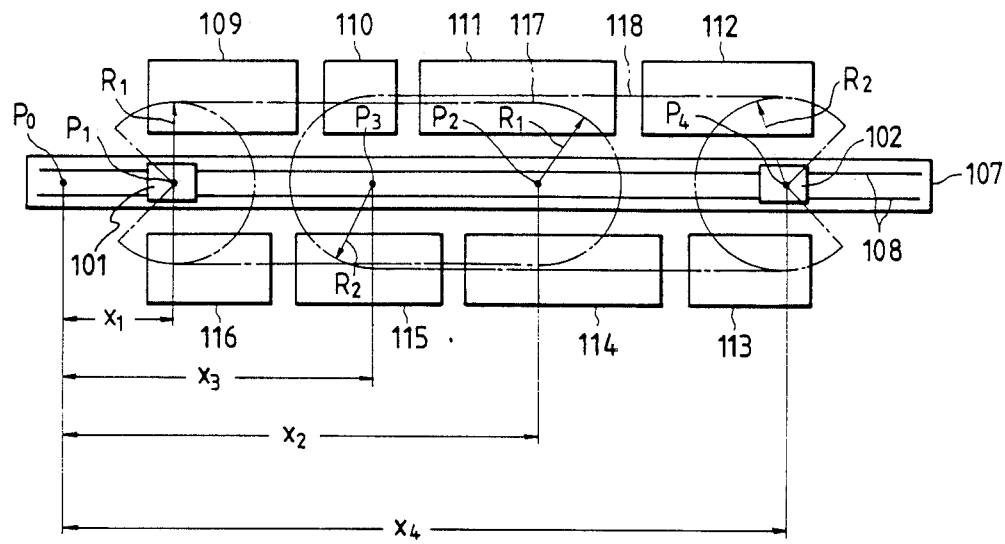
FIGS. 3 and 4 are schematic diagram showing plan views, each showing the arrangement of the robots in the running type robot control system according to the present invention.
Figure 4:
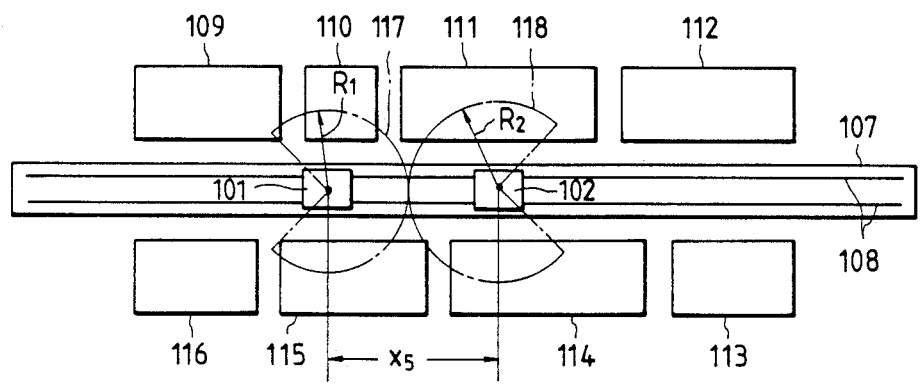

FIGS. 3 and 4 are schematic diagrams showing top plan views of the embodiment of the running type robot control system where the positions of the two robots are indicated. In FIGS. 3 and 4, a running stand 107 and a pair of guide rails 108 arranged on the running stand 107 constitute a running path along which the robots 101 and 102 run. Reference numerals 109 to 116 designate machines to be actuated by the robots 101 and 102, four machines 109 112 being arranged on one side of the running path whereas the remaining four machines 113 to 116 are arranged on the other side thereof. A dot-dash line 117 indicates a service area of the No. 1 robot 101, and the No. 1 robot 101 is allowed to run from a point ($P_1$) to point ($P_2$). On the other hand, a dot-dash line 118 indicates a service area of the No. 2, robot, and the No. 2 robot 102 is allowed to run from a point ($P_3$) to a point ($P_4$). With such an arrangement shown in FIGS. 3 and 4, the No. 1 robot 101 has the service area 117 covering the No. 1 to No. 3 machines 109 to 111 and the No. 6 to No. 8 machines 114 to 116. Further, the No. 2 robot 102 has the service area 118 covering the No. 2 to No. 4 machines 110 to 112 and the No. 5 to No. 7 machines 113 to 115. ($R_1$) and ($R_2$) denote radii of swing movements of areas of the No. 1 and No. 2 robots 101 and 102, and ($P_0$) denotes an origin point on an X axis assumed by the robot-operating software. ($X_1$) indicates a distance between the X-axis origin point ($P_0$) and the point ($P_1$), and ($X_2$) indicates a distance between the X-axis origin point ($P_0$) and the point ($P_2$). ($X_3$) indicates a distance between the X-axis origin point ($P_0$) and the point ($P_3$), and ($X_4$) indicates a distance between the X-axis origin point ($P_0$) and the point ($P_4$). In FIG. 4, ($X_5$) indicates a minimum distance that is to be maintained in order to avoid the interference of swing movements of the arms of the robots 101 and 102, and this minimum distance is set as the standard distance 106 shown in FIG. 2 in advance.

Figure 5:
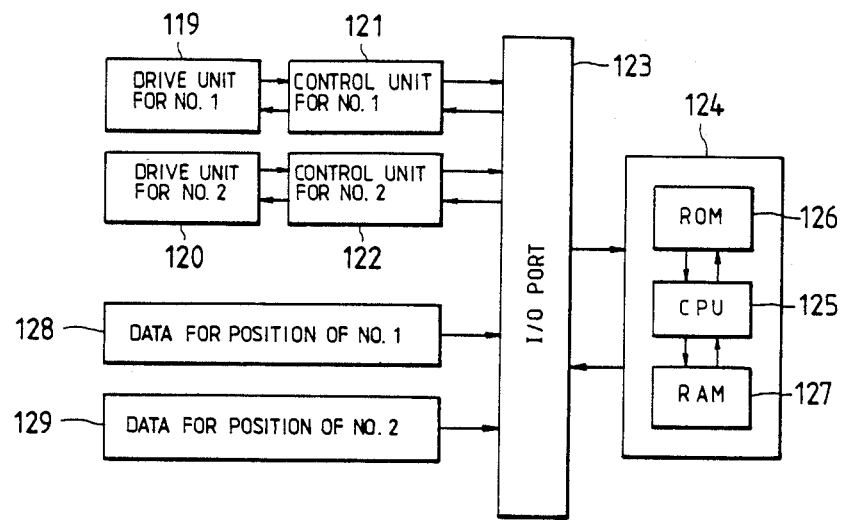
FIG. 5 is a block diagram showing an example of a control system of the present invention.

FIG. 5 is a block diagram showing an example of a control system for use in the embodiment of FIG. 2. In FIG. 5, reference numeral 119 designates a drive unit for the No. 1 robot; 120, a drive unit for the No. 2 robot; 1 21, a control unit for the No. 1 robot and 122, a control unit for the No. 2 robot. The control units 121 and 122 are coupled through an I/O part 123 to a microcomputer 124 including a CPU 125, A read-only memory (ROM) 126 and a random access memory (RAM) 127. Input through the I/O part 123 to the microcomputer 124 are both data 128 and 129 representing the present position of the No. 1 and No. 2 robots, respectively.

Figure 6:
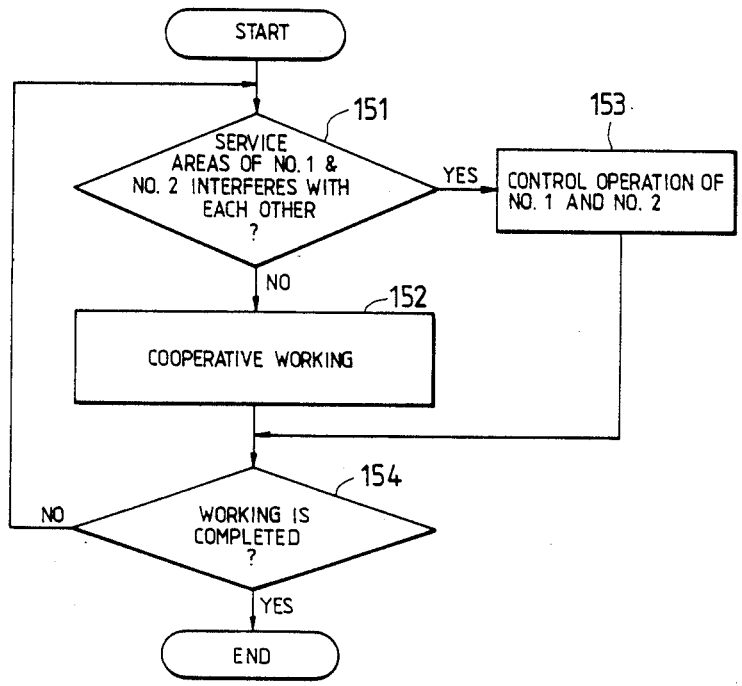
FIG. 6 is a flow chart for description of the operation of the system shown in FIG. 5.

An operation of the embodiment described herein before will be described with reference to FIG. 6 which is a flow chart showing a robot control program stored in the ROM 126 of the microcomputer 124.

In a step 151, it is detected whether the interference between the service areas of the robots 101 and 102 occurs or not. In the case of no interference, the operation advances to the following step 152 where the cooperative working of the robots 101 and 102 is performed. On the other hand, in the case where the service areas 117 and 118 interfere with each other, the step 151 is directed to a step 153, the operations of the robots 101 and 102 are controlled to comply with the following expressions: (A) according to the robot control program.

$$X_1 + R_1 21\ X_3 - R_2$$

$$X_2 + R_1 < X_3 - R_2$$

$$X_2 + R_1 < X_4 - R_2$$

More specifically at first, the relative distance between the robots 101 and 102 is obtained arithmetically in the microcomputer 124 based on the position data 128 and 129, each representative of the present invention of the robot. The operations of the robots 101 and 102 are controlled so that the thus obtained relative distance therebetween always exceeds the predetermined standard distance 106, i.e., the minimum distance ($X_5$). More concretely, assuming that the robots 101 and 102 approach each other and the relative distance between them becomes nearly equal to the minimum distance ($X_5$), the microcomputer controls the robots to stop once, and then controls the running areas of both robots 101 and 102 so that the relative distance is maintained at not less than the minimum distance ($X_5$). Due to this control operation, the interference between the service areas 117 and 118 can be prevented positively.

After the above described control operation, the step 153 advances to a step 154 where it is confirmed whether or not the entire operations of the robots have been completed. In case of incompletion, the step 154 returns to the initial step 151 so that the above operation is performed repeatedly.

As apparent from the above, by way of controlling the operations of robots 101 and 102 to comply with the expression (A), it is possible to prevent the interference between the service areas 117 and 118 from occurring.

While both of the robots 101 and 102 are controlled in the above described embodiment of the present invention, provided that priority is given to the actuation or service of the robots 101 and 102, the same function can be obtained by controlling the operation of one of the two robots having such priority. Further, modifications are possible without departing from the principle of the present invention. In other words, a plurality of robots can be controlled in the same control system.

According to the present invention, since the relative position between the two robots adjacent to each other is obtained arithmetically based on the data representing the present position of each robots and the operations of the two robots are controlled so that the thus obtained relative distance is maintained not lower than the predetermined standard distance, even if the service areas of the two adjacent robots overlap with each other, it is possible to inhibit an occurrence of interference of the service areas thereof.

Figure 7:
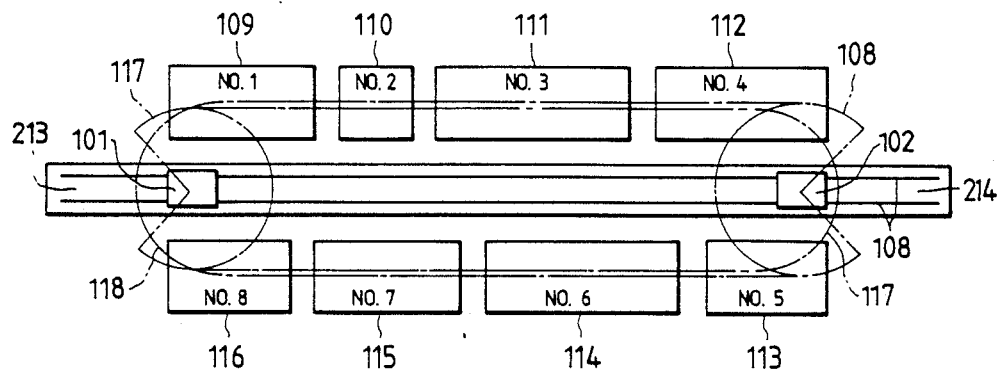
FIG. 7 is schematic diagram showing a plan view of another embodiment of the system according to the present invention.
Figure 8:
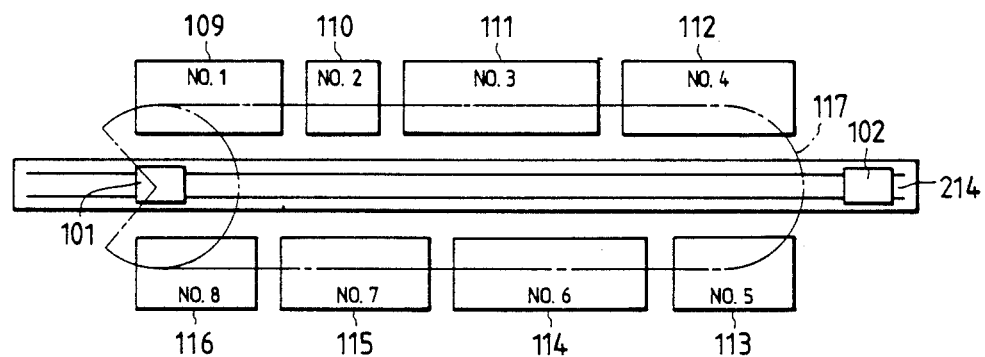
FIG. 8 is a schematic diagram for description of the operation of the system shown in FIG. 7.

FIGS. 7 and 8 are also schematic diagrams showing top plan views of another embodiment of the running type robot control system according to the present invention. In FIGS. 7 and 8, parts and elements that are the same as those in the first embodiment of FIGS. 3 and 4 bear the same or corresponding reference numerals or characters. Reference numerals 213 and 214 designate turnouts for the No. 1 and No. 2 robots 101 and 102, respectively, and dot-dash lines 117 and 118 indicate the service areas of robots 101 and 102, respectively.

As shown in FIGS. 7 and 8, the turnouts 213 and 214 are provided at both ends of the running path along which the robots 101 and 102 run, and four machines 109 to 112 and four machines 113 to 116 are arranged on opposite sides of the running path. Although the service area of the robot is limited in the first embodiment, the robots of the second embodiment have the service areas covering all of the machines 109 to 116, respectively.

In a normal operating condition, however, the No. 1 robot 101 and the No. 2 robot 102 are moved cooperatively. Namely, the No. 1 robot 101 moves with one of the machines, 109 to 111, 115, and 116, for instance, whereas the No. 2 robot 102 is controlled to cover several other robots thereof, 111 to 115 for instance. In this case, the reason why the service areas of the robots 101 and 102 overlap is so that the two robots can transmit and service workpieces.

With such a running type robot control system shown in FIG. 7, assuming that the robot 102 becomes inoperative during cooperative operation of the two robots, as shown in FIG. 8, the robot 102 is controlled to be directed to the turnout 21,4 and the remaining robot 101 is controlled to monitor all of the machines 109 to 116 alone. On the contrary, if the robot 101 becomes inoperative, the same operation is effected so that the robot 102 can cover all of the machines 109 to 116.

Figure 9:
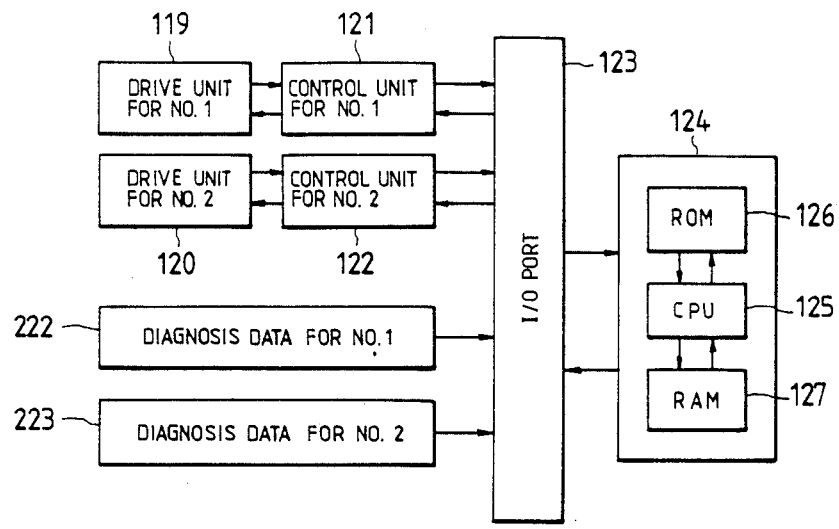
FIG. 9 is a block diagram showing an example of a control system for another embodiment of the present invention.

FIG. 9 is a block diagram showing another example of a control system for use in the second embodiment of FIGS. 7 and 8. In FIG. 9, reference numerals 222 and 223 designate data representing the diagnosis result of the No. 1 and No. 2 robots 101 and 102, respectively. Both diagnosis data 222 and 223 are applied through the I/O port 123 to the microcomputer 124 which performance a determination function an the input data. In case of one of the robots being out of order, the microcomputer 124 issue an instruction to the robot control units 121 and 122 so that one of the drive units 119 and 120 drives the damaged robot to be directed to its turnout, whereas the other drive units drives the remaining robot so as to cover all of the machines.

Figure 10:
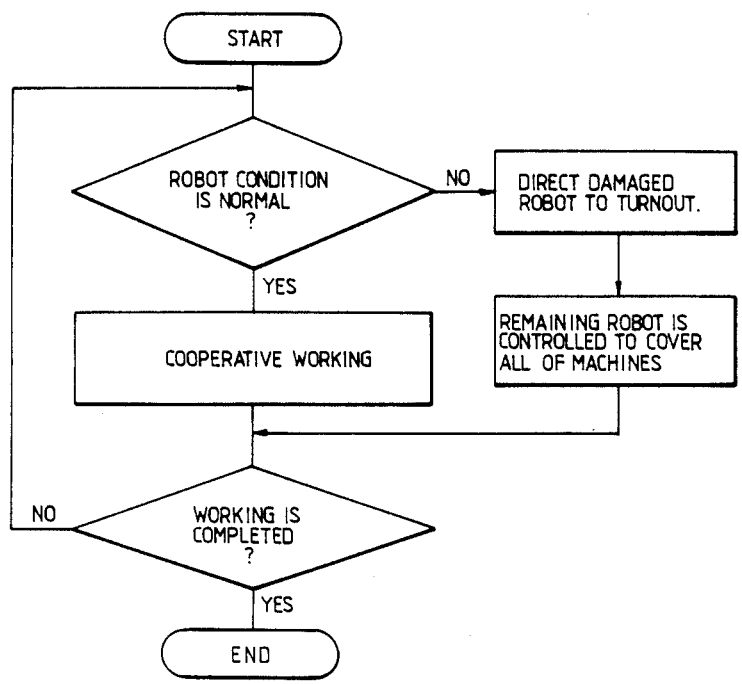
FIG. 10 is a flow chart for the operation of the control system shown in FIG. 9.

FIG. 10 is a flow chart showing the control operation described above.

In a step 230 of FIG. 10, it is detected whether both of the robots 101 and 102 are in a normal condition or not. In the case of both robots being in the normal condition, the cooperative working of the step 230 advances to the following step 231 to continue robots 101 and 102. On the other hand, when one of the robots 101 and 102 becomes inoperative, the damaged robot is controlled to be directed to its turnout in a step 233. Subsequently, the remaining robot which is in a normal operation condition, is controlled so as to cover all of the machines to be actuated and handled thereby in a step 234. Then, in the following step 232 it is confirmed whether or not the whole operation for all of the machines has been completed.

According to the second embodiment of the present invention, it is possible to control the two robots effectively thereby to improve remarkably the productivity and workability of the robots when compared with the conventional control system having a single running type robot. Further, even if one of the two robots is inoperative, while the productivity may be reduced, the continuous operation of the running type robot control system can be kept without complete interruption of the production line.

What is claimed is:

1. A running type robot control system, comprising:
    at least two running type robots running along a common running path, running ranges of said robots overlapping with each other;
    present position detecting means for detecting respective present positions of said robots;
    arithmetic calculating means for arithmetically calculating a relative distance between adjacent ones of said robots, based on outputs from said detecting means, the outputs representing the respective present positions of said robots; and
    controlling means, coupled to said arithmetic calculating means, for controlling at least one of said robots which is adjacent to another of said robots so that the relative distance therebetween is maintained not smaller than a minimum predetermined standard distance.

2. A running type robot control system as defined in claim 1, wherein a control signal is supplied from said control means to said at least one robot in order that the running stage of said at least one robot receiving said control signal is limited forcibly.

3. A running type robot control system as defined in claim 1, wherein said present position detecting means detects the present position of said robots from an origin point determined on the running path.

4. A running type robot control system as defined in claim 1, wherein said controls means control the operation of said robots according to priority given to said robots.

5. A running type robot control system as defined in claim 1, wherein two robots are employed as said running type robots.

6. A running type robot control system as defined in claim 5, wherein said running path is provided with turnouts at both ends thereof, respectively.

7. A running type robot control system as defined in claim 6, further comprising a service area covering all machines to be actuated, said machines being arranged at both sides of said running path, wherein said two robots operate cooperatively in a normal operation condition to service all of the machines, whereas upon an occurrence of a fault in one of said robots, the damaged robot is controlled to be directed to one of the turnouts and the remaining robot is controlled to cover all of said machines.

8. A running type robot control system as defined in claim 7, wherein the normal operation, said running path of said robot is predesignated according to the machines to be actuated.

* * * * *